(12) United States Patent
Flitsch

(10) Patent No.: US 11,812,868 B2
(45) Date of Patent: *Nov. 14, 2023

(54) METHODS AND APPARATUS FOR FURNITURE PROTECTION

(71) Applicant: Thomas Jacob Flitsch, Moorpark, CA (US)

(72) Inventor: Thomas Jacob Flitsch, Moorpark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,560

(22) Filed: Dec. 18, 2022

(65) Prior Publication Data

US 2023/0122495 A1     Apr. 20, 2023

Related U.S. Application Data

(63) Continuation of application No. 17/620,576, filed as application No. PCT/US2021/015922 on Jan. 29, 2021, now Pat. No. 11,559,144.

(60) Provisional application No. 63/048,197, filed on Jul. 6, 2020.

(51) Int. Cl.
| | |
|---|---|
| *A47C 31/11* | (2006.01) |
| *B60N 2/60* | (2006.01) |
| *A47C 27/14* | (2006.01) |

(52) U.S. Cl.
CPC ............ *A47C 31/11* (2013.01); *A47C 27/144* (2013.01); *B60N 2/60* (2013.01)

(58) Field of Classification Search
CPC .................................. A47C 3/11; B60N 2/60
See application file for complete search history.

(56) References Cited

U.S. PATENT DOCUMENTS

| | | | | |
|---|---|---|---|---|
| 5,320,407 | A * | 6/1994 | Tell ......................... | A47C 31/11 297/229 |
| 5,702,791 | A | 12/1997 | Zegeer | |
| 5,785,219 | A * | 7/1998 | Kraft ...................... | A47G 9/066 224/901.2 |
| 5,843,556 | A | 12/1998 | Levas | |
| 5,920,931 | A * | 7/1999 | Zuehlke ................. | A47C 7/021 5/490 |
| 6,030,034 | A | 2/2000 | Plohetski | |
| 6,223,367 | B1 * | 5/2001 | French .................. | A47G 9/0207 5/419 |
| 6,345,866 | B1 * | 2/2002 | Jackson ................. | A47C 31/11 297/229 |
| 6,493,891 | B1 * | 12/2002 | Livingston ............... | A45C 9/00 5/636 |
| 6,783,175 | B1 * | 8/2004 | Henderson ................ | A45F 4/06 297/219.1 |
| 7,258,399 | B2 | 8/2007 | Neustat | |
| 7,591,033 | B2 * | 9/2009 | Theriault ............... | A47C 31/11 5/419 |

(Continued)

FOREIGN PATENT DOCUMENTS

KR     20120032746 A     4/2012

*Primary Examiner* — Timothy J Brindley

(57) ABSTRACT

Methods and apparatus for creating furniture protection which may be easily installed and removed are disclosed. The stored furniture protection may be designed to function as decorative items for the furniture such as pillows, bolsters and the like. In some examples, the stored furniture protection may take a form as a pillow and then when unfolded may form a lightweight impermeable cover for the furniture.

2 Claims, 11 Drawing Sheets

(56) References Cited

U.S. PATENT DOCUMENTS

| | | | |
|---|---|---|---|
| 7,690,725 B1 | 4/2010 | Rawlings | |
| 9,265,330 B1* | 2/2016 | Golin | A45F 3/04 |
| 10,292,508 B1 | 5/2019 | Kim | |
| 2006/0200910 A1 | 9/2006 | Taylor | |
| 2013/0187415 A1 | 7/2013 | Shelley | |
| 2013/0328362 A1 | 12/2013 | Miller | |
| 2018/0263389 A1 | 9/2018 | Lee | |
| 2019/0133336 A1 | 5/2019 | Ennis | |
| 2019/0328117 A1* | 10/2019 | Larsen | A47C 31/11 |
| 2020/0305607 A1* | 10/2020 | Leverett | A47C 7/18 |
| 2020/0329883 A1* | 10/2020 | Jaikaransingh | A47C 31/10 |

* cited by examiner

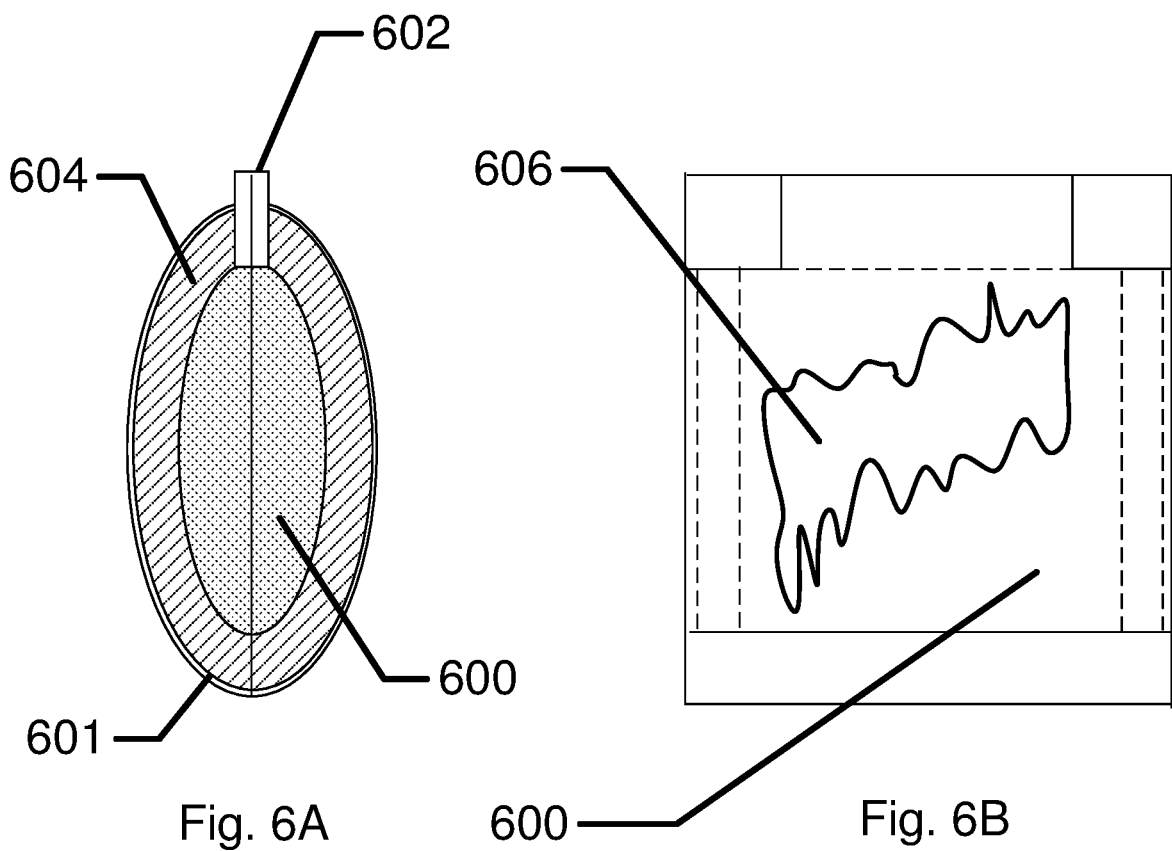
Fig. 6A
Fig. 6B
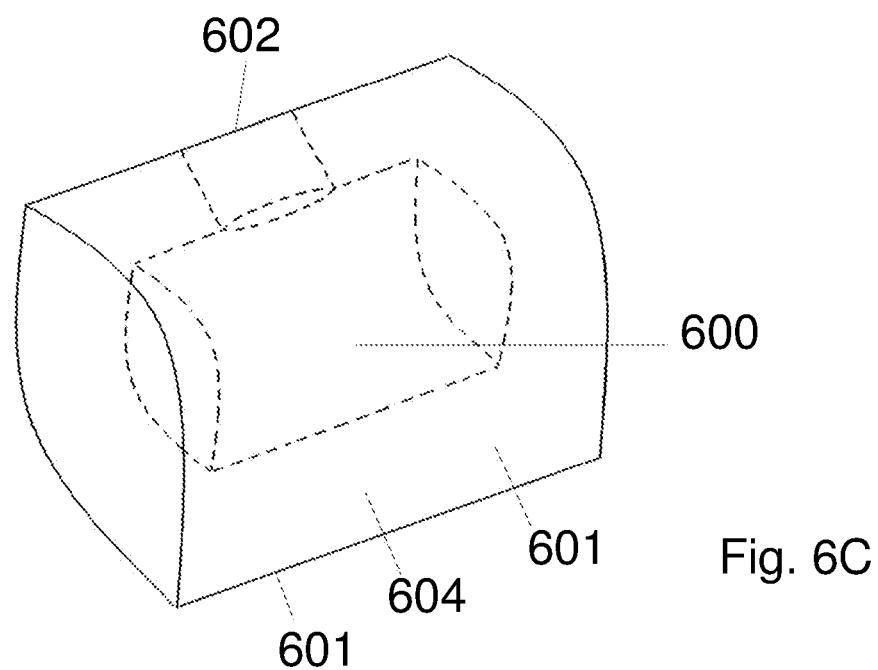
Fig. 6C

FORMING A FIRST SOLID FOAM COMPONENT INTO A SHAPE WITH AT LEAST A PORTION OF A CAVITY  1001

COVERING AT LIST A PORTION OF THE FIRST SOLID FOAM COMPONENT WITH A FABRIC COVERING  1002

CUTTING A PANEL OUT OF A FURNITURE COVERING MATERIAL  1003

PLACING THE PANEL WITHIN THE CAVITY; WHEREIN THE PANEL IS SHAPED TO COVER A FURNITURE DURING A USE STATE; AND WHEREIN THE PANEL IS SHAPED TO FIT WITHIN THE CAVITY DURING A STORAGE STATE  1004

Fig. 10

METHODS AND APPARATUS FOR FURNITURE PROTECTION

CROSS REFERENCE TO RELATED APPLICATIONS

This application claims priority to the U.S. Nonprovisional Application Ser. No. 17/620,576 filed Dec. 17, 2021 as a continuation, which in turn was a national phase filing of PCTUS/2021/015922 filed Jul. 6, 2020, which in turn claimed the benefit of the U.S. Provisional Patent Application Ser. No. 63/048,197 filed Jul. 6, 2020 and entitled METHODS AND APPARATUS FOR FURNITURE PROTECTION, the contents of each of which are incorporated herein by reference in their entirety.

FIELD OF THE INVENTION

The present invention relates to methods and apparatus which relate to protecting furniture. The protection elements may be stored in decorative manners associated with the furniture.

BACKGROUND OF THE INVENTION

External furniture such as patio chairs, chaise lounges, love seats and benches are subject to precipitation, pollen, dust, dirt and sunshine which limits the use and enjoyment of using the patio chair, chaise lounge, loveseat and bench. It may be a common for one to sit on a cushion of a piece of furniture after rain or dew has occurred and get one's clothing wet where it contacts the cushion. Furthermore, even dry furniture surfaces can be covered with precipitates such as dust and pollen and may transfer them to clothing when one sits on the surface. Conventional covers may be bulky and require a significant amount of storage space when not in use. They may also be difficult to operate and may take a significant amount of time to install and remove. It may be desirable to have light weight easy to use and easy to store covers for furniture to improve the issues related to precipitation, moisture, light aging, dust and pollen. Additionally, it may be desirable to have a light weight cover that is conveniently stored nearby that can be easily returned after the chair is used so furniture can be covered overnight or when not in use.

SUMMARY OF THE INVENTION

Accordingly, methods and apparatus for creating furniture protection which may be easily installed and removed are disclosed. The stored furniture protection may be designed to function as decorative items for the furniture such as pillows, bolsters and the like. In some examples, the stored furniture protection may take a form as a pillow and then when removed from storage is unfolded to form a lightweight impermeable cover for the furniture. The furniture protection may include the impermeable cover material as well as clasps or other fastening devices to hold the material in place. In some examples, cushioning material may also be included to improve the function of the apparatus as a storage container that looks liked a decorative pillow. The cover may include elastic portions to gather the covering material around features of the furniture such as furniture cushions. The covering may protect and cover all sides of cushions of a piece of furniture. In some examples, the covering may protect and cover the cushions of the piece of furniture but not cover other parts of the furniture such as arms, legs and other support members as these parts may not be permeable to water.

In some examples, portions of the covering, which may act to give form to the folded covering in its stored form may remain as a protruding area of the covering when it is deployed to cover the furniture. The protruding area of the covering may locally lift the covering surface improving the ability of the deployed covering to shed water and avoid puddling.

In some examples, cording material may be affixed to a panel of the covering device. In some examples, the cording material may include nylon, polyethylene, cotton or other materials. The cording material may function to hold the covering in place, under use conditions such as when the weather includes high levels of wind. In some examples, the cording material may interact with clamps, loops, rings and similar fasteners that may be included in panels of the covering material to allow the cording material to place tension on the fastener.

In some examples, the covering may be removed from the piece of furniture, so that the furniture may be used in its normal operational mode. In some examples, the covering may be designed to neatly and easily fold within a pocket region of the covering. In some examples, when the covering is folded into itself, i.e., into a pocket of the covering itself, the resulting folded covering may be inserted into a storage container that looks like a cushion, pillow, bolster or the like.

In some examples, the material that comprises the covering may include lightweight materials, such as thin polymer meshes. In some examples, a woven material that has been treated for water fastness may be used. The covering material may have decorative patterns that appear on its surface. The patterns may result from weaving directly. In other examples, patterns may be imprinted upon the covering material. In some examples, both external and internal surfaces of the covering material may be imprinted, and internal surfaces may include imprinting of directions of use for the covering. In some examples, the pillow storage container may be decorative in nature complimenting or contrasting with the cover or original furniture design.

One general aspect includes an apparatus to cover a piece of furniture. The apparatus also includes a first panel of a first furniture covering material. The apparatus also includes examples where the first furniture covering material is flexible and is folded upon itself, where a size of the first panel is at least as large as the size of a first seat cushion of the piece of furniture. The apparatus may also include at least a first securing feature and a second securing feature connected to the first panel of the first furniture covering material on a first side portion of the first furniture covering material and a second distal side portion of the first panel of the first furniture covering material. The apparatus may also include a banding material, where the banding material is fixed to the first panel in a middle portion of the banding material, where unfixed portions of the banding material protrude from two end portions of the banding material, and where the unfixed portions are long enough to interlock with the first securing feature and the second securing feature when the first panel is installed upon the piece of furniture. The apparatus may include a foam tube, where the foam tube may include a cavity within a body of the tube. The cavity may continue through a side radial portion of the foam tube, where the cavity may include a volume at least large enough to contain all of the first panel, the first securing feature, the second securing feature and the banding material; where the apparatus may be used as a secured covering to surfaces of at least a first cushion of the piece of furniture at a first time. In some examples, the panel of the apparatus may be folded to store at least the first panel, the first securing feature, the second securing feature and the banding material within the foam tube at a second time. The apparatus at the second time may be utilized as a decorative pillow not affixed to the piece of furniture.

One general aspect includes an apparatus to cover a piece of furniture. The apparatus may also include a first solid foam component, where the first solid foam component may include at least a portion of a cavity. The apparatus may include a fabric covering, where the fabric covering surrounds at least a portion of the first solid foam component. The apparatus may also include a panel of a furniture covering material; where the panel covers a furniture during a use state. In some examples, the panel may be stored within the cavity during a storage state.

Implementations may include one or more of the following features. The apparatus to cover a piece of furniture where the first solid foam component and the fabric covering together may form a pillow during the storage state. The apparatus to cover a piece of furniture may include a hinge to open a portion of the apparatus to gain access to the cavity. In some examples, the foam component and the screw interface may form a screw top container. When a screw top is joined to the apparatus to cover a piece of furniture, the apparatus may form a pillow when the panel is stored within the cavity. The screw interface may join the first solid foam component to a second solid foam component with a second screw interface. When the screw interface is joined to the second screw interface, the apparatus may form a pillow when the panel is stored within the cavity.

In some examples, the elastic strip may pull at least a portion of the fabric covering and the foam component together to form a closure. When the elastic strip draws the fabric covering to form a closure the apparatus may form a pillow when the panel is stored within the cavity.

In some examples a draw string may pull at least a portion of the fabric covering together to form a closure. When the draw string draws the fabric covering to form a closure, the apparatus may form a pillow when the panel is stored within the cavity.

One general aspect includes a method of producing a covering for a piece of furniture. The method of producing may also include forming a first solid foam component into a shape with at least a portion of a cavity; covering at list a portion of the first solid foam component with a fabric covering, cutting a panel out of a furniture covering material, and placing the panel within the cavity. In some examples, the panel may be shaped to cover furniture during a use state, and in some examples the panel may be shaped to fit within the cavity during a storage state.

Implementations may include one or more of the following features. The method may include connecting a hinge to the first solid foam component. The method may include adding an elastic ribbon to the fabric covering to create a flexible covering of the cavity. The method may include adding a draw string to the fabric covering to create a covering of the cavity. The method may include molding a screw interface into a plastic material and attaching the molded screw interface to the first solid foam component. In some examples, the panel of furniture covering material may be formed of acrylic fibers. The method may include the step of coating the furniture covering material with a water repellent coating. The method may include the step of coating the furniture covering material with an ultraviolet protective coating.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIGS. 6A-6C—an illustration of an exemplary furniture storage form for concealing a covering, wherein the stored form creates a bolster pillow with an edge opening and illustrating an exemplary pocket to store the furniture covering material when not in use as a covering.

FIG. 10—an illustration of an exemplary method to form an exemplary furniture storage form for concealing a covering.

DETAILED DESCRIPTION OF THE INVENTION

While the invention has been described in conjunction with specific embodiments, it is evident that many alternatives, modifications and variations will be apparent to those skilled in the art in light of the foregoing description.

Accordingly, this description is intended to embrace all such alternatives, modifications and variations as fall within its spirit and scope.

Furniture protections which may be easily installed and removed are disclosed. In some examples, the furniture protection device may be designed to perform multiple function such as the protection of the furniture in a deployed state and a function of a pillow, bolster and the like in a stored form. In some examples, the stored furniture protection may take a form as a pillow and then when unfolded may form a lightweight impermeable cover for the furniture. The form of the storage region may be at least partially retained when the covering is deployed which may create a deployed shape upon a piece of furniture that aids in the movement of water off of the covering.

Figure 1:
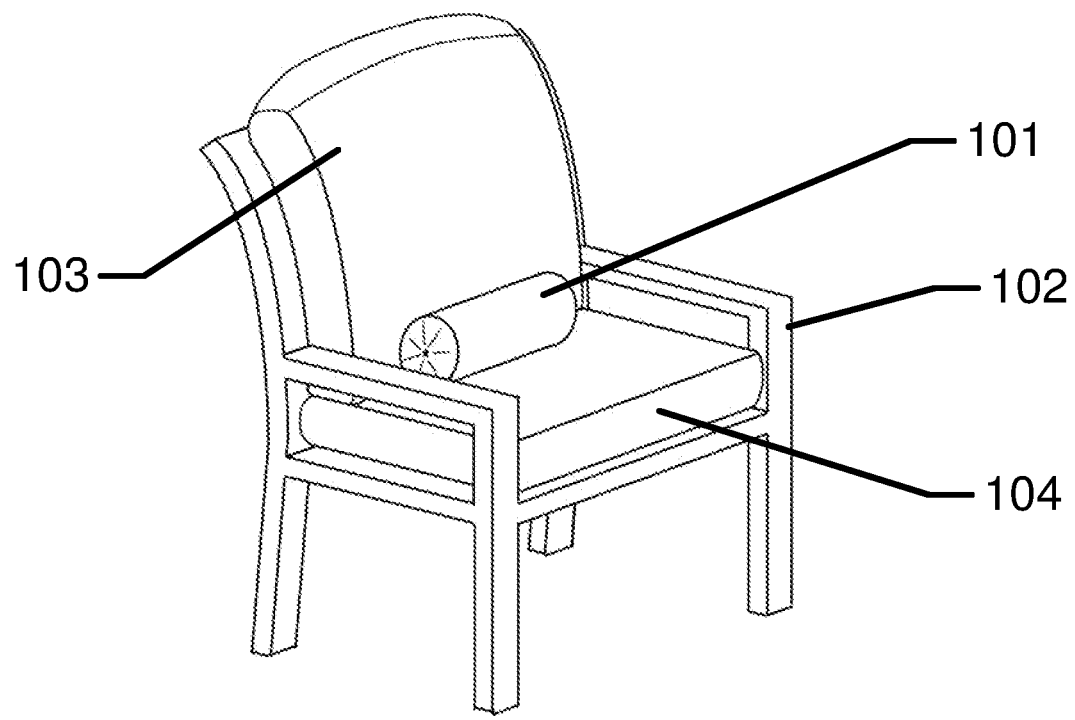
FIG. 1—an illustration of an exemplary front perspective view with a rolled up furniture covering concealed in an exemplary bolster pillow pocket form.

Proceeding to FIG. 1, a furniture covering is illustrated in the stored form. In the example, the stored form is illustrated as a decorative bolster pillow. In some other examples, the stored version may take a shape of a throw pillow that has a concealed pouch or pocket to hold the weatherproof cover for the patio furniture. The bolster pillow 101 may form a decorative fabric covered foam cylindrical accessory pillow. The shape of the stored covering may take many forms and shapes including examples of square, rectangular or polygon shaped accessory pillows. In these various examples, the apparatus may have an attached waterproof covering that is capable of being folded or rolled into a compact form which may then be stored within the accessory pillow. When the covering is stored, the resulting pillow form may be similar or identical to other accessory pillows associated with the furniture. In other examples, the stored form may be the only pillow or accessory associated with the furniture.

The design or printing upon both the covering surfaces and the external features of the pillow type structure may be flexibly associated with aesthetic demands of a particular use. In some examples, the covering surfaces and pillow surface may be made to match an existing aesthetic of associated furniture. In some examples, decorative images or patterns may be included to create a different look to the covering. In some examples, the covering may include dark patterns which may aid in the drying of the surface after exposure to moisture or rain. In other examples, light patterns may be used to aid in reduced heat absorption during sunlight exposure.

Different forms of the various types of covers may be designed for use with various examples of standard patio chairs with arms 102 or without arms. The covering may cover a seat cushion 103 and/or a back cushion 104 on an exemplary chair with two cushions. Other shapes of furniture such as lounges may be covered with a similar apparatus. In still further examples, coverings for tables, grills and the like may also be produced, where the resulting pillow may be used as a pillow or other decorative feature on a couch, chair or chaise lounge.

Figure 2:
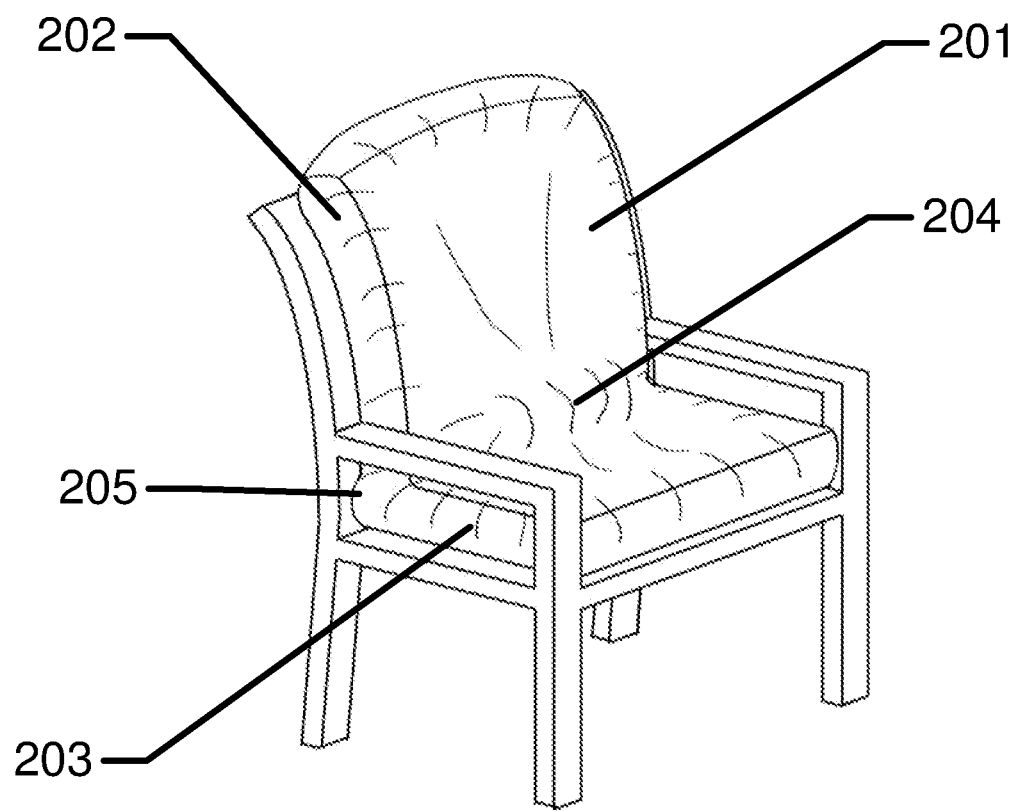
FIG. 2—an illustration of an exemplary front perspective view with a furniture covering deployed over a piece of furniture and with an exemplary remaining bolster pillow pocket form aiding in the shedding of water.

Proceeding to FIG. 2, an illustration depicts the covering in an exemplary deployed form. The covering 201 may be slipped over the cushions. The covering may be formed of various materials such as, in a non-limiting sense, nylon, polyethylene, treated cotton or the like. The rear of the cushion 202 may be covered by the covering which may extend to the underside of the seat cushion. The covering may also have sides 203 have elastic banding that gathers the side material holding it in place. In an example, the material that is used to surround the stored covering and create a pillow shape may be attached to a rear side of the covering. In FIG. 2, this pillow shaped material under the covering when it is deployed may cause elevation 204 of the covering at the base of the seat of the chair. The elevation may create an external shape that facilitates the drainage of rainwater and accumulated dew away from the covering to a nearby floor. In some examples, the rear of the covering may be secured with cording 205 that may be sewn to the covering material. In some examples, attachment features (underneath the covering surface) may be used such as d rings, hoops, rings or other fasteners capable of holding or routing the cording.

Figure 3:
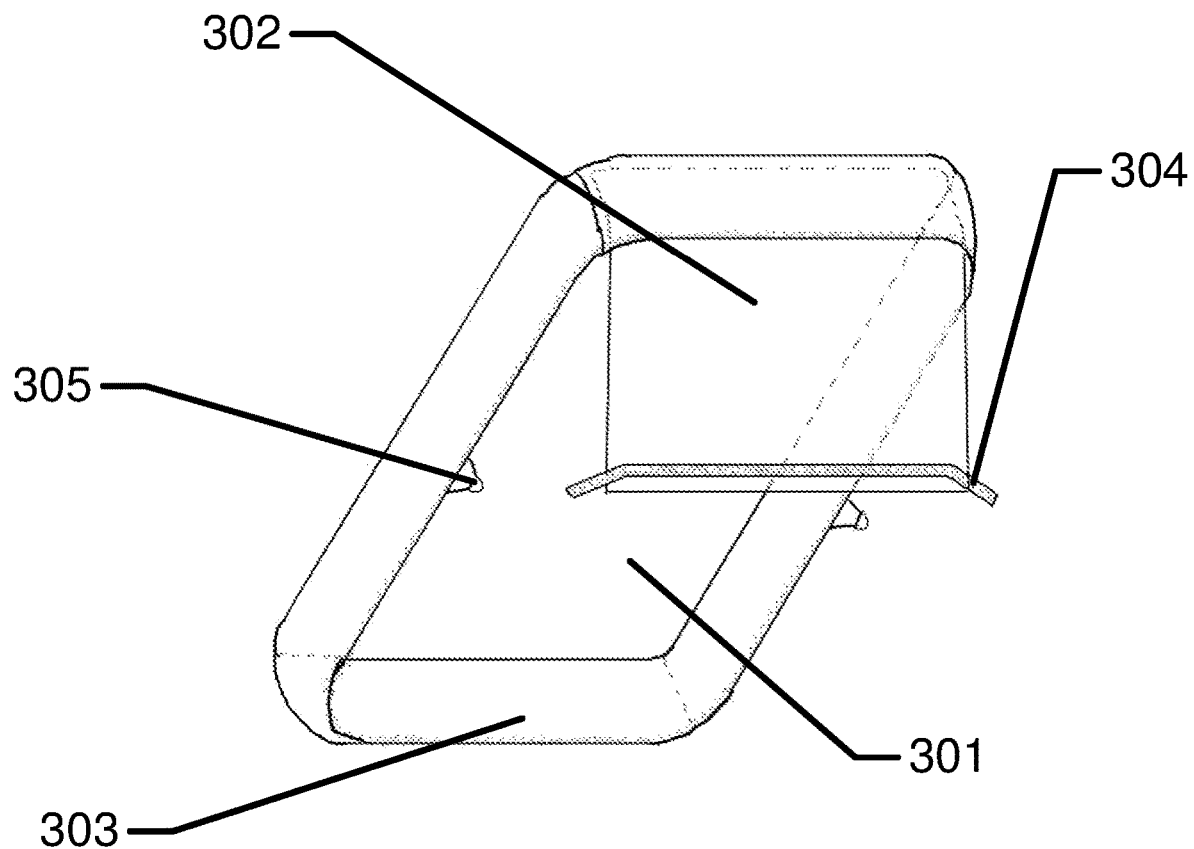
FIG. 3—an illustration of a view of an exemplary furniture covering from an underside.

Regarding FIG. 3, an exemplary illustration is provided of the covering as viewed from the underside. The covering may have a single panel of material 301 that is sized to cover the seat cushion and back cushion. In some other examples, multiple panels may be used to create a seam at a portion between a seat and a back cushion of a furniture. In some examples, the panel may be made of a nylon material, other examples may include waterproof treated cotton, polyethylene, rubber, synthetic rubber and the like. In some examples, the panel may continue to a full length or another back panel 302, which may be attached to the single panel of material 301, may be used. The back panel 302 may cover the back cushion thickness and may cover the full length of the rear of the back cushion. The sides of the cushions may be covered by side panels 303 panels that are the same thickness or somewhat wider than the cushion thickness. In some examples, the side panels may be approximately 2-3 inches wider than the cushion thickness. In some examples, the side panels 303 may be gathered on the underside with elastic banding sewn to the side panels. In still further examples, the side panel may be sewn to the front panel.

Continuing with FIG. 3, in some examples, there may be a banding material 304 sewn onto the back panel 302. In other examples, there may be numerous manners of attaching different panels to each other, including in a non-limiting manner the use of adhesive materials or fusion by melting of certain materials. A combination of these exemplary attachment methods may also be used such as the use of adhesive materials along with sewing of panels.

In some examples, as illustrated in FIG. 3, the banding material 304 may be secured to securing features 305 attached to the side panels. In some examples, a strap with "D" type rings or other rings may be attached to the side panel and may be used to attach the banding material 304 in a secure manner. In other examples, a strap with a loop or a strap with a gromet may be used. In still further examples, a gromet, ring, or D-ring may be attached directly to the side panel without a strap. There may be numerous fixtures that are attached to the banding material 304 to facilitate its attachment to securing features 305. In some examples, a hook or clamp may be attached to a clasp that flexibly rides along the banding material, which may be adjustably fixed upon the banding material. In other examples, the securing features 305 may have a shape such that a corresponding feature on the banding material 304 may fit into a fixed joint together. In some examples, locking features which may be actuated by finger pressure may be used to engage a positive connection of the banding material 304 to the securing features 305. Other closures may be used to achieve a function of routinely attaching a strap type feature to a securing feature which allows for holding the covering material in a desired position to cover the piece of furniture and hold the position even when wind and other forces may apply moving pressure to the cover.

Figure 4:
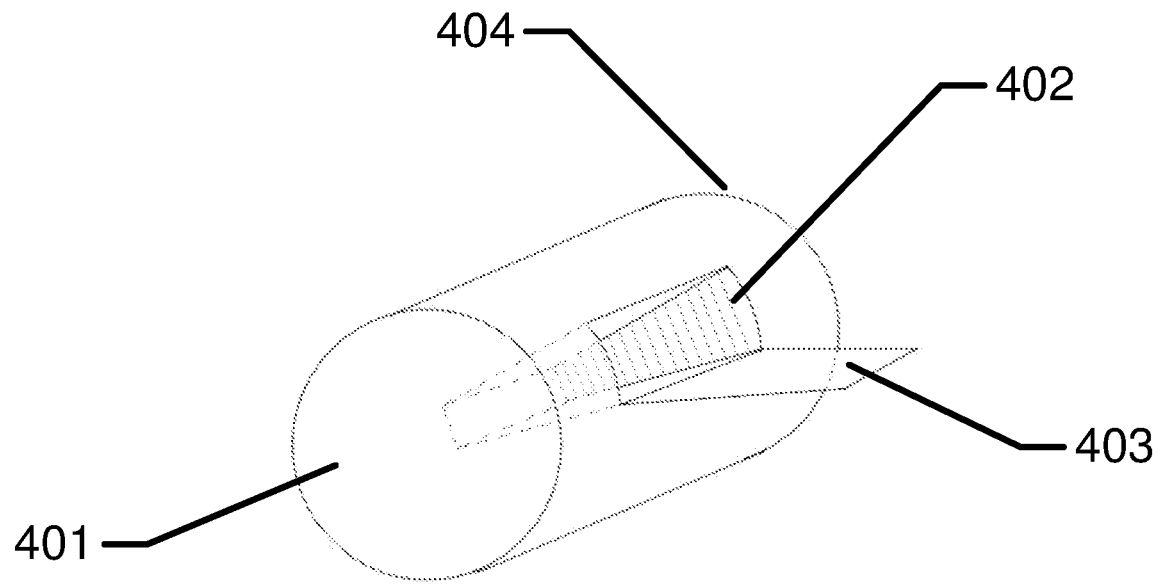
FIG. 4—an illustration of an exemplary furniture storage form for concealing a covering, wherein the stored form creates a bolster pillow, and illustrating an exemplary pocket to store the furniture covering material when not in use as a covering.

Referring now to FIG. 4, an exemplary bolster pillow is shown revealing an example of a type of storage pocket that may be formed into the apparatus to create a storage location for the covering. In some examples, the bolster pillow 401 may be a fabric wrapped polyethylene foam tube. In these examples, the foam cylinder may be at least partially hollowed out to create a pocket 402 for storing the covering. In some examples, a tab of material 403 may be attached to a side of the pocket 402 or to the external covering material of the bolster pillow 401 itself. The tab of material 403 may be a fabric, or a plastic sheet, a woven strap or other materials that can be used to create a flexible attachment between the body of the bolster pillow 401 and the covering to be stored within. The tab of material 403 may be connected to the covering to secure the pieces together. A covering 404 for the pillow 401 may be folded over and only partially sewn in some examples, leaving an opening that allows the covering structural pieces to be stuffed into the pocket while concealing the pocket when the covering is stored inside the pillow. In some alternative examples, the opening may be concealed behind a flap that covers the storage opening when the covering is stored within. In still further examples, closures such as zippers, hook and loop fasteners, or snaps may be used to hold a flap of material over the opening. Although a foam tube example has been described, other examples may include structures that form a cavity with a solid feature such as sewn fabric panels that are stuffed with a filling material where the panels are relatively sized to form a pillow shaped item with a cavity within.

Figure 5A:
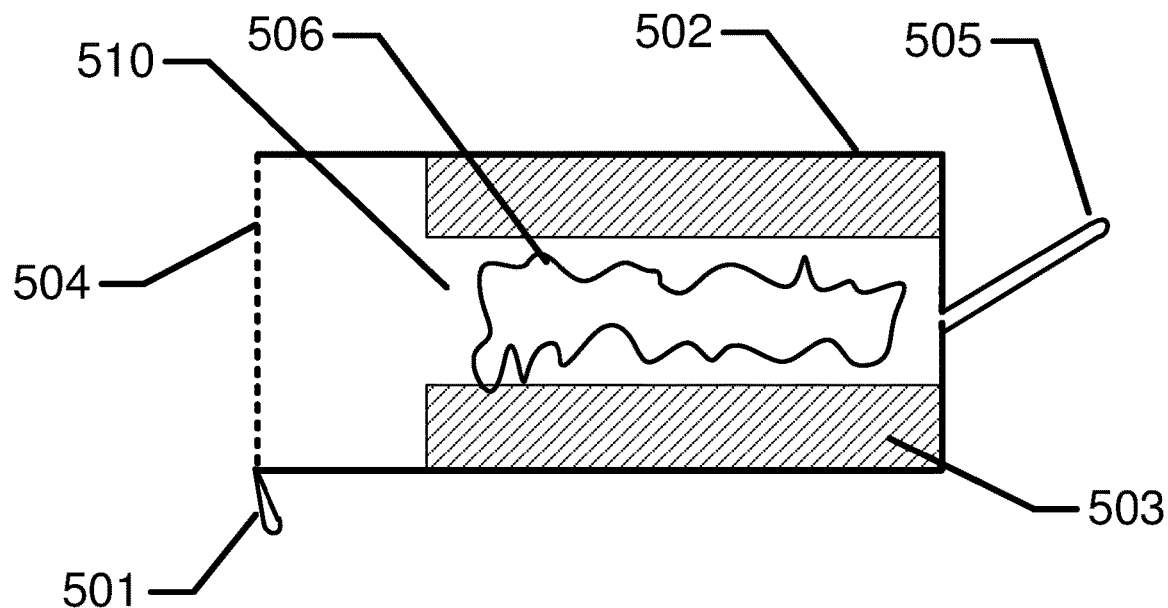
FIGS. 5A and 5B—an illustration of an exemplary furniture storage form for concealing a covering, wherein the stored form creates a bolster pillow in a cylindrical form with end openings and illustrating an exemplary pocket to store the furniture covering material when not in use as a covering.
Figure 5B:
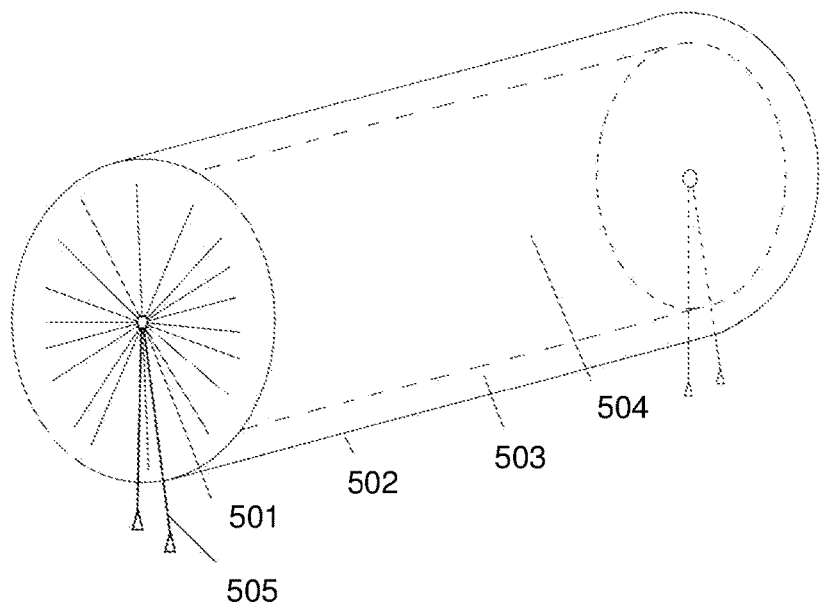

There may be numerous embodiments for forming a pillow like device with a cavity within. As an example, referring to FIG. 5A and 5B, a foam pillow may be formed in a cylindrical form. A foam piece 503 may be rolled or formed into a cylinder with open ends and a cavity 510 within. A covering 506 may be stored within the cavity when not in use. And the covering 506 may be withdrawn from the cavity to be placed on the furniture as discussed. In some examples, the body of the pillow may be connected to the covering 506 and may create a relief under the covering to facilitate movement of moisture, dew and rain away from the furniture. When the covering 506 is stored within the pillow (within the foam) a fabric 502 may surround the pillow body. The fabric 502 may be designed to match the patterns and colors of the furniture which is covered. The ends of the fabric may be sewn into endcaps with drawstrings 505 and 501. In the illustration the drawstring 505 at one end may be withdrawn to clows the end cap as illustrated in the perspective drawing 5B. The other end is illustrated with opening 504 in the open configuration where the drawstring 501 is not withdrawn.

Another type of embodiment is illustrated in FIGS. 6A-6C. Referring to FIG. 6A, a molded foam pillow body 604 with a cavity 600 may be formed in an oblong cylindrical shape. One side of the pillow body may have an opening through which the covering 606 may be folded into the cavity 600. The pillow may have a fabric covering 601 surrounding the foam and the ends of the pillow. The opening on the side of the pillow form may have a clasping or closing mechanism 602 which may be elastic features which may be stretched to open the pillow and when released restore the pillow to a closed configuration. In other examples the closing mechanism may include fasteners, buttons, snaps, clasps, magnetic clasps and the like to effect closing of the pillow when the covering is stored within.

Figure 6D:
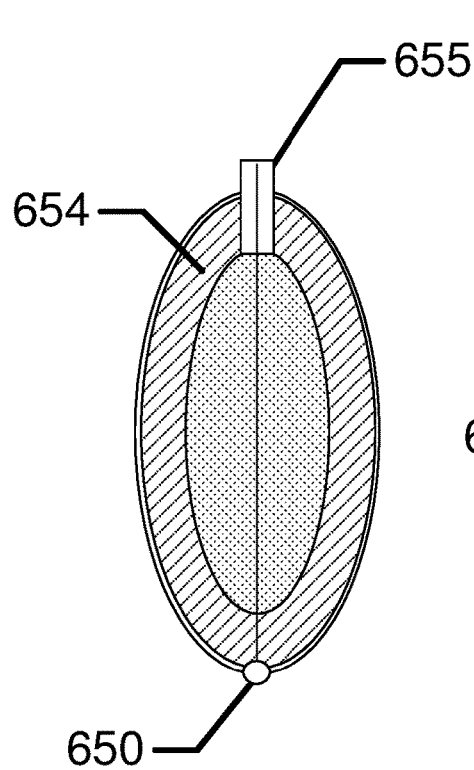
FIGS. 6D-6G—an illustration of an exemplary furniture storage form for concealing a covering, wherein the stored form creates a bolster pillow with a hinged edge opening and illustrating an exemplary pocket to store the furniture covering material when not in use as a covering.
Figure 6E:
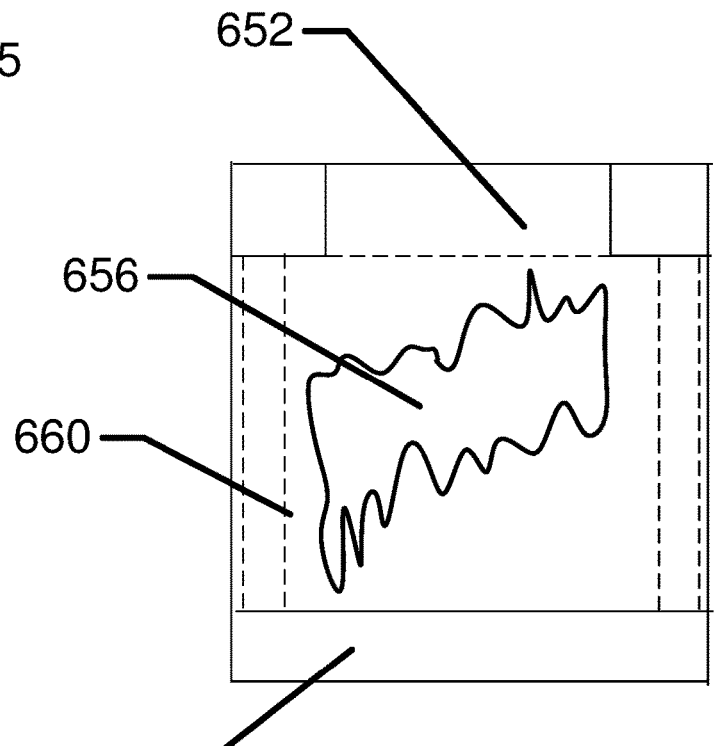
Figure 6F:
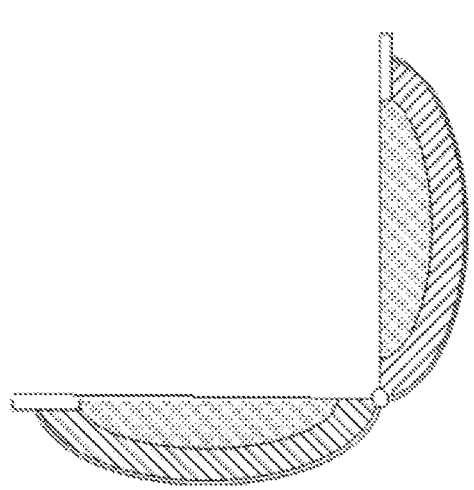
Figure 6G:
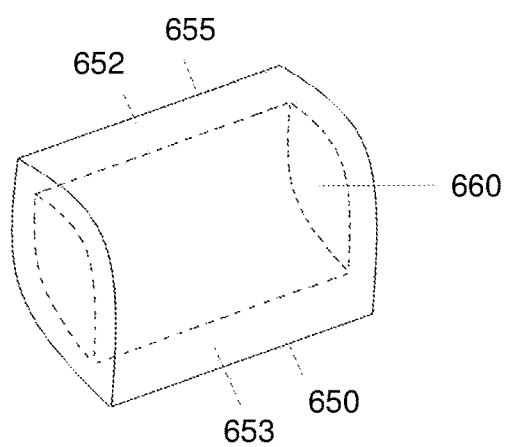

Another similar type of embodiment of a folded or molded foam pillow form is illustrated in FIGS. 6D-6G. A molded foam pillow body 654, with a cavity 660 to store the covering 656 in, may have a hinged side such that the pillow body may be opened around the hinge as illustrated in FIG. 6F. The closed form of the pillow embodiment is illustrated in FIG. 6D. The side of the pillow form opposite the hinge may include fastenings 655 which may include the types of closing mechanisms discussed previously, which may be connected to fastener connection regions 652 molded into the foam body. On the opposite side of the pillow, there also may be molded hinge connection regions 653 built into the foam body to support the hinge 650. There may be numerous types of hinges that may be used to facilitate opening of the pillow body.

Figure 7A:
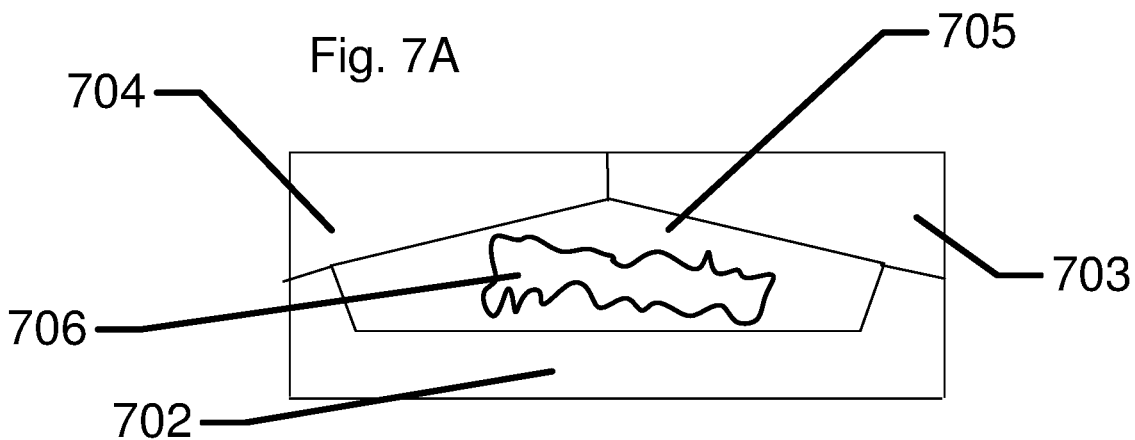
FIGS. 7A-7C—an illustration of another exemplary furniture storage form for concealing a covering, wherein the stored form creates a bolster pillow with a hinged edge opening and illustrating an exemplary pocket to store the furniture covering material when not in use as a covering.
Figure 7B:
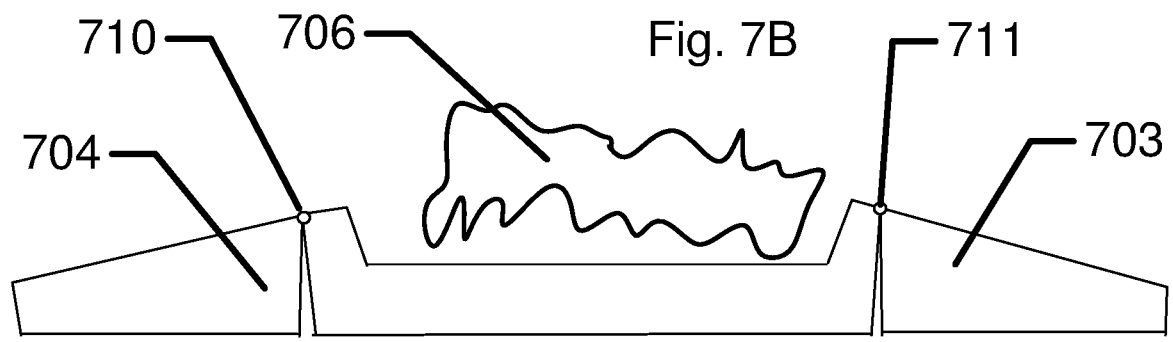
Figure 7C:
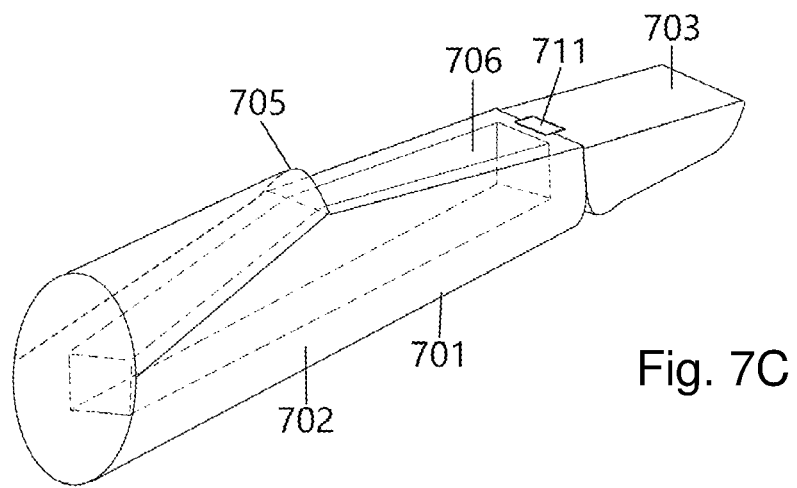

Referring to FIGS. 7A-7C another example of a hinged pillow form is illustrated with two hinge elements 710 and 711 that allow the pillow to fully open when both hinged sides are open. FIG. 7A illustrates the example in a closed form whereas FIG. 7B illustrates a cross section of the example in an open form. Referring to FIG. 7A, molded foam components may be formed into a base 702, and two top portions 704 and 703. The foam components form a cavity 705 when closed that may be used to store the covering 706. In the opened form in FIG. 7B the covering may be easily accessible while the foam container may form a support to elevate the covering above the furniture as has been mentioned previously. In the perspective illustrate of FIG. 7C, the pillow is illustrated with a single hinged side open. The pillow foam components may have fabric coverings 701 attached to their external faces such as by adhesive attachment between the fabric covering 701 and the base 702 foam.

Figure 8A:
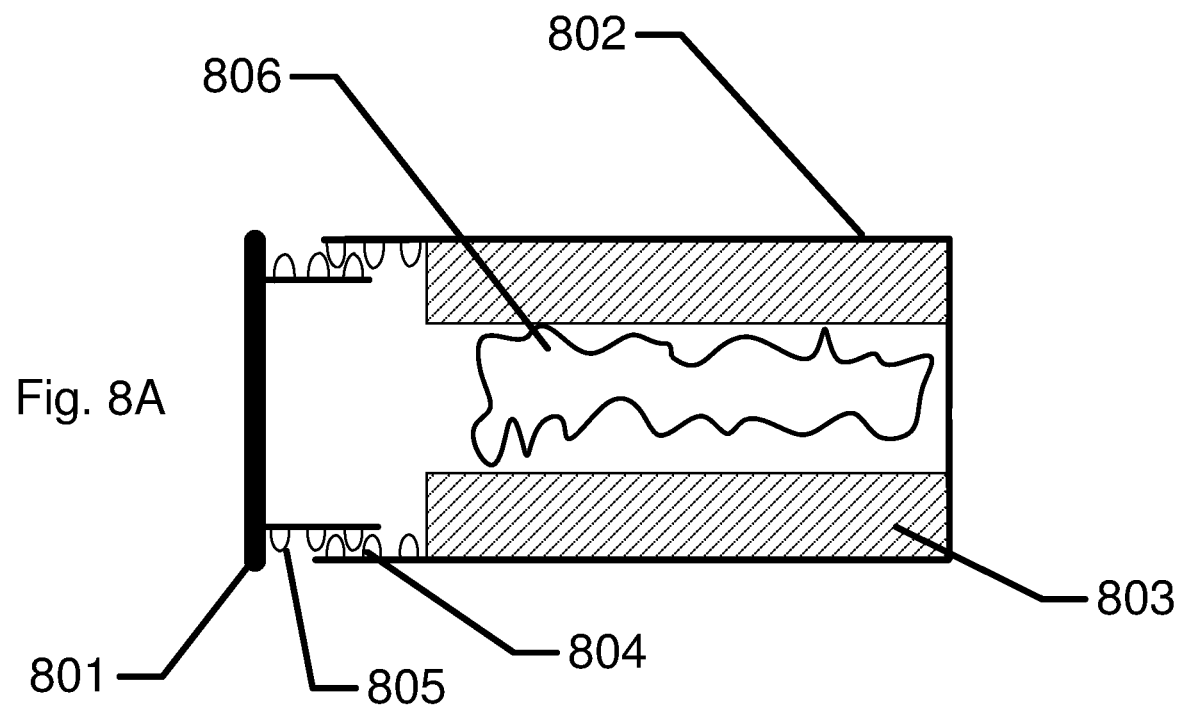
FIGS. 8A-8B—an illustration of an exemplary furniture storage form for concealing a covering, wherein the stored form creates a bolster pillow with a screw on end cap opening, and illustrating an exemplary pocket to store the furniture covering material when not in use as a covering.
Figure 8B:
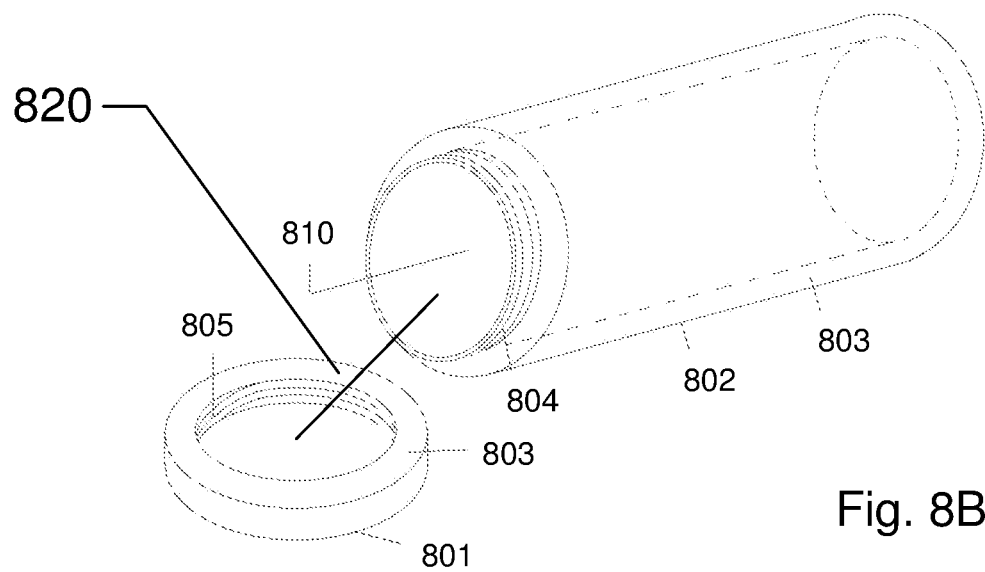

Referring now to FIGS. 8A and 8B another type of pillow form covering container is illustrated as a screw on top type can configuration. As illustrated, a foam base form 803 may be created by molding the foam, cutting the foam or bending the form into a cylinder shape with a cavity 810 within to store a covering 806. In this example, one end may be a closed form of the foam and fabric covering 802. The other end may include a screw feature 804. The feature may be attached to the foam body or the fabric covering by adhesive or sewing techniques. The screw feature 804 may be a plastic or metal molded feature with threading. A complementary screw feature 805 may be included on a top feature 801. In some examples the entire top may be molded or machined in a single part made of metal, plastic, wood or other material capable of being formed into screw threads. In some examples, a tether 820 of some material such as plastic, thread, yarn, metal wire or the like may be used to hold the top to the base when it is opened as is illustrated in FIG. 8B. When opened the covering may be deployed upon the furniture. In some examples the covering container may be separated from the covering itself. In other examples, the covering may be attached by a tether or other means to the container and the container may give the covering an elevation upon the furniture to facilitate drainage of water, dew, rain and the like while the covering is deployed upon the furniture.

Figure 9A:
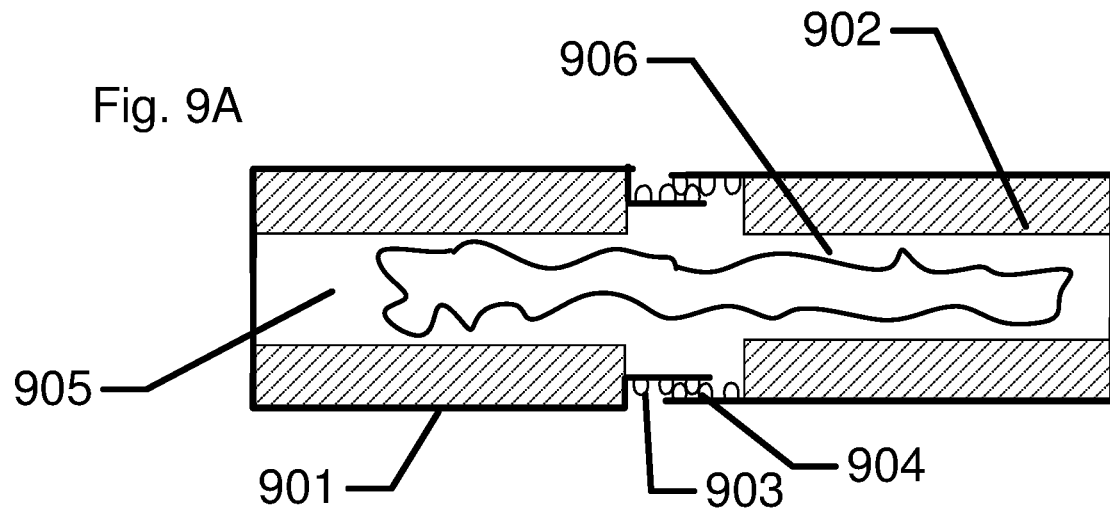
FIGS. 9A-9B—an illustration of an exemplary furniture storage form for concealing a covering, wherein the stored form creates a bolster pillow with a screw on end cap opening and illustrating an exemplary pocket to store the furniture covering material when not in use as a covering.
Figure 9B:
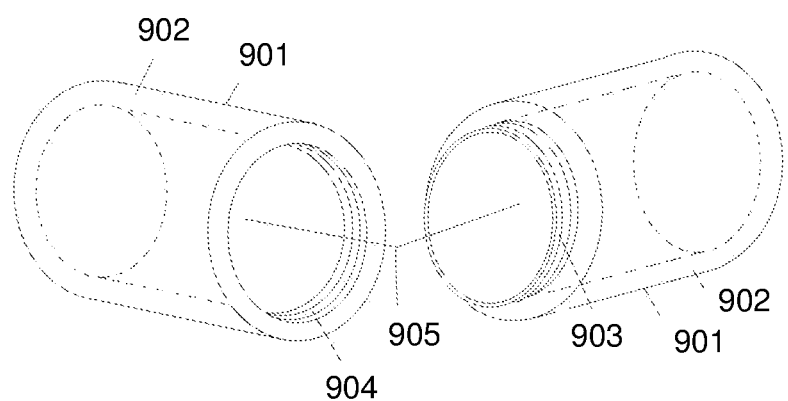

An alternative screw type covering container may be seen in reference to FIGS. 9A and 9B. In FIG. 9A an example of a two canister screw type canister is illustrated in a closed form. In FIG. 9B, a perspective illustration of a container with a screw type connection element is illustrated. Two canister sides may be formed of foam material elements 902 with fabric coverings each of which is connected to a screw feature. An interior screw feature 903 may be attached to one side and an exterior screw feature 904 to the other side. The screw features may interlock with each other and create a cavity 905 that may contain the covering 906. The two canister features may have a feature such as a tether attached to each of them so that when they are opened, they stay proximate to each other. As well, in some examples, the covering may be separate from the canisters. In other examples, it may be attached to one or both of the canister sides. The perspective illustration of FIG. 9B illustrates how the internal cavity may be opened to allow the covering to be removed. Each of the sides may be covered with a fabric 901 covering with aesthetic aspects matched to the furniture and providing covering to the body of the canister.

The fabric coverings of the various types of examples as have been described may be made of fabrics that are coated or inherently formed from fibers that have weather resistant characteristics such as acrylic fibers, canvas fibers and the like. In other examples, fabrics may be coated with materials that afford weather protection or protection of other environmental factors such as sunlight and atmospheric chemical exposures and the like.

For example, the fabric coverings for the various designs both for the pillow covering and the furniture covering (that may be stored within the pillow) may be formed of canvas material which may be treated to be water retardant. In some examples, an external outdoor fabric such as Sunbrella® brand acrylic fiber based fabric. The upholstery fabric version may be utilized with various color dyes and patterns. In some examples, Sunbrella® or other fabrics may be treated with fire retardants. Other examples may include ripstop nylon formulations which may be urethane coated. Marine level specification vinyl fabrics may also be used.

For decorative and structural purposes, welt cording may be used for a piping edge on the pillow examples. In some examples, a solid plastic welt cord may be used. In some examples, nylon cord or hard foam cord may be used.

Various types of cushion form materials may be employed. Foam may be used in some examples to form the cushion shape. Any natural fiber or artificial material may be employed as a cushion forming material; however, foam and polyethylene foam may be preferred for amongst other reasons that it does not absorb water as some other materials may. The foam may be formed into a desired shape directly. In other examples, foam sheets or foam chunks may be used. A combination of molded and cut foam pieces may also be employed. In some examples, formed polyurethane, sheet polyurethane or chunk polyurethane may be used.

In some examples, a pillow form design may include a draw string or draw strings to help form functional aspects of the pillow. In some examples, a natural cord material may be employed. In other examples, nylon cord or polyester cord may be used. The draw strings may be held in a position with plastic draw string clips. In other examples aluminum or brass draw clips may be used.

In some of the examples, pieces of elastic banding may be used to form a flexible closed access point in the pillow. There may be various materials that the elastic banding may be formed of including latex elastic banding and non-latex elastic band on cotton banding.

Elastic banding may be used to hold the furniture covering in place. In some examples polypropylene webbing may be used for securing pieces. In other examples, nylon webbing, cotton webbing and the like may be employed. The various elastic components may also be treated for water resistance, UV resistance, mold resistance and the like. In other examples, attachment rings may be used to hold the furniture covering in place. The attachment rings may be formed of a variety of plastics such as PVC, ABS as non-limiting examples or of metal material such as aluminum, brass, painted steel or the like. Buttons or snaps, either decorative or functional may be made of plastics or metals as well.

In many examples, the pillow fabric covering and the furniture covering may be sewed into a functional shape. The various sewing threads may be colored to match fabric designs. The threads may desirably have weather and exposure resistance aspects either inherently or by treatment. In common applications, nylon or polyester thread may be employed. Threads based on natural fibers such as cotton may be employed in some examples.

Referring now to FIG. 10, exemplary method steps are described for the processing of a furniture covering storage device. At step 1001, the process may begin with the forming a first solid foam component into a shape with at least a portion of a cavity. In some examples, other materials than foam may be used to form similar or equivalent shapes. At step 1002, the foam component may be covered with a fabric covering. In some examples, at list a portion of the first solid foam component may be covered with the fabric covering. Proceeding to step 1003, a panel of fabric may be cut out of a furniture covering material. In some examples, additional processing to the panel to join other panels of fabric, to add elastic pieces, snaps, buttons, Velcro(R) or more generally a hook and loop fabric attachment device, or other fastener devices may be added to the panel. Straps may be added to hold the panel upon a piece of furniture.

Proceeding to step 1004 the panel, with attachments of various kinds may be placed within the cavity. In some examples, the panel may be shaped to cover a specific piece of furniture or design of furniture during a use state. In other examples, the panel may be shaped to fit within the cavity formed as described above during a storage state. Particular embodiments of the subject matter have been described. Other embodiments are within the scope of the following claims. In some cases, the actions recited in the claims can be performed in a different order and still achieve desirable results. In addition, the processes depicted in the accompanying figures or described in the discussion herein, do not necessarily require the particular order shown or described, or a particular sequential order, to achieve desirable results. In certain implementations, multitasking and parallel processing may be advantageous. Nevertheless, it will be understood that various modifications may be made without departing from the spirit and scope of the claimed invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

As has been mentioned, the illustrations depict aspects of exemplary embodiments and the relative scale of illustrated features may be exaggerated for depiction of various aspects. Accordingly, the scale of features illustrated is not intended to limit the scope of the elements of the various embodiments consistent with the present application.

What is claimed is:

1. An apparatus to cover a piece of furniture, the apparatus comprising:
   a first solid foam component, wherein the first solid foam component comprises at least a portion of a cavity;
   a fabric covering, wherein the fabric covering surrounds at least a portion of the first solid foam component;
   a panel of a furniture covering material;
   wherein the panel covers a furniture during a use state; and
   wherein the panel is stored within the cavity during a storage state;
   wherein when a screw top is joined to the apparatus to cover a piece of furniture, the apparatus forms a pillow when the panel is stored within the cavity further comprising a screw interface, wherein the foam component and the screw interface form a screw top container further comprising a screw interface, wherein the screw interface joins the first solid foam component to a second solid foam component with a second screw interface.

2. The apparatus to cover a piece of furniture of claim 1 wherein when the screw interface is joined to the second screw interface, the apparatus forms a pillow when the panel is stored within the cavity.

* * * * *